United States Patent
Achtelik et al.

(10) Patent No.: US 6,287,100 B1
(45) Date of Patent: Sep. 11, 2001

(54) SEALING DEVICE ON A SHAFT JOURNAL OF A DRY-RUNNING HELICAL ROTARY COMPRESSOR

(75) Inventors: Carsten Achtelik, Dinslaken; Karl-Heinz Gilfert, Oberhausen; Arno Heinz, Oberhausen; Walter Murmann, Oberhausen, all of (DE)

(73) Assignee: GHH-Rand Schraubenkompressoren GmbH, Oberhausen (DE)

( * ) Notice: Subject to any disclaimer, the term of this patent is extended or adjusted under 35 U.S.C. 154(b) by 0 days.

(21) Appl. No.: 09/446,367
(22) PCT Filed: Apr. 30, 1999
(86) PCT No.: PCT/EP99/02961
§ 371 Date: Jul. 18, 2000
§ 102(e) Date: Jul. 18, 2000
(87) PCT Pub. No.: WO99/57440
PCT Pub. Date: Nov. 11, 1999

(30) Foreign Application Priority Data

Apr. 30, 1998 (DE) .......................................... 298 97 796 U

(51) Int. Cl.$^7$ ............................ F04C 18/16; F04C 27/00; F16J 15/32; F16J 15/447
(52) U.S. Cl. ..................... 418/104; 418/201.1; 277/351
(58) Field of Search ................................ 418/104, 201.1; 277/349, 351, 571

(56) References Cited

U.S. PATENT DOCUMENTS

| 2,018,372 | * | 10/1935 | Mason .................................. 277/351 |
| 5,354,071 | * | 10/1994 | McClure ............................... 277/571 |
| 5,501,469 | * | 3/1996 | Ducugnon et al. ................... 277/571 |
| 6,095,780 | * | 8/2000 | Ernens ................................. 418/104 |

FOREIGN PATENT DOCUMENTS 5-18375 * 1/1993 (JP) ...................................... 418/104

* cited by examiner

Primary Examiner—John J. Vrablik
(74) Attorney, Agent, or Firm—Michael Best & Friedrich LLP

(57) ABSTRACT

A sealing arrangement on a rotor shaft peg of a dry-running rotation screw compressor for establishing a seal between the rotor (1) and the oil-lubricating bearing (7) of the shaft peg (3) has a labyrinth slit seal (11), located closer to the rotor, and a lip seal ring (13), located closer to the bearing, and in between an annular space (27) with ventilation opening (29) towards the bottom. The shaft peg bears a bearing race (25) made of a hardened material, which acts in cooperation with the lip sealing ring (13), and which can also extend above the area of the labyrinth slit seal (11).

10 Claims, 2 Drawing Sheets

SEALING DEVICE ON A SHAFT JOURNAL OF A DRY-RUNNING HELICAL ROTARY COMPRESSOR

In dry-running rotation screw compressors, no oil for lubrication, cooling and sealing is introduced between the rotors into the sealing space. The ribs of the main runner and the nuts of the secondary runner form a "dry" engagement which nevertheless achieves a seal between them. Such screw compressors are particularly suited because they allow the absence of oil in the seal space in applications in pneumatic conveyor installations, for example, for filling and emptying silos, tanks, tanker vehicles and similar instruments with bulk goods. In particular, in the pneumatic conveyance of sensitive goods such as foods or chemicals it is important that the conveyance air stream is free, to a high extent, of oil particles.

In the case of dry-running screw rotors, an appropriate seal of the shaft peg must be used to prevent oil from the oil-lubricated bearings of the shaft pegs to reach the sealing space as a result of leakage along the shaft pegs. It is already known from GB A 1189856, to arrange on the shaft peg of rotation screw compressor, next to each other, a conventional sealing ring and an oil sealing ring, which are separated from each other by an annular space which is connected to the external air. However, because of the high level of abrasion, ordinary sealing rings are unsuited for establishing seals of rapidly rotating shaft pegs, which can reach circumferential speeds of 55–150 m/sec. On the other hand, it is known to use two adjacent, contact-free, labyrinth seals to seal the shaft peg of a dry-running rotation screw compressor; of the labyrinth seals, the one located closest to the oil-lubricated bearing is in the form of an oil return threading. However, it has been shown that such contact-free labyrinth seals cannot always reliably prevent the leakage of oil along the shaft peg to the seal space, particularly if there is high pressure differential on the suction-side of the seal. From DE A24 41 520, a shaft seal is known for a screw rotor seal with water injection, which presents several sealing hoops surrounding the rotor pegs, and located between the annular chambers, of which one is applied to the ring chamber with the gas densified by the compressor, as a barrier gas, and the other ring chamber is a drainage chamber for bearing oil drainage. The sealing hoops are labyrinth seal hoops, of which one also can be a contact seal. This shaft seal is a dynamic seal, which uses pressurized barrier gas, which must be shunted from the conveyor gas stream of the compressor, and which thus entails an output loss.

It is an object of the invention to provide a sealing arrangement which works without barrier gas, which presents a particularly high sealing effect and, nevertheless, good abrasion resistance, for a shaft peg of a dry-running rotation screw compressor.

For achieving the object, the invention provides a sealing arrangement on a rotor shaft peg of a dry-running rotary screw compressor for establishing a seal between the rotor and an oil-lubricated bearing of the shaft peg. The sealing arrangement has a labyrinth gap seal closer to the rotor and a lip seal ring closer to the bearing and in between an annular space with a ventilation opening towards the atmosphere. The shaft peg carries a bearing ring made of hardened material which cooperates with the lip sealing ring.

One embodiment variant of the invention is explained in further detail with reference to the drawing in which.

Figure 1:
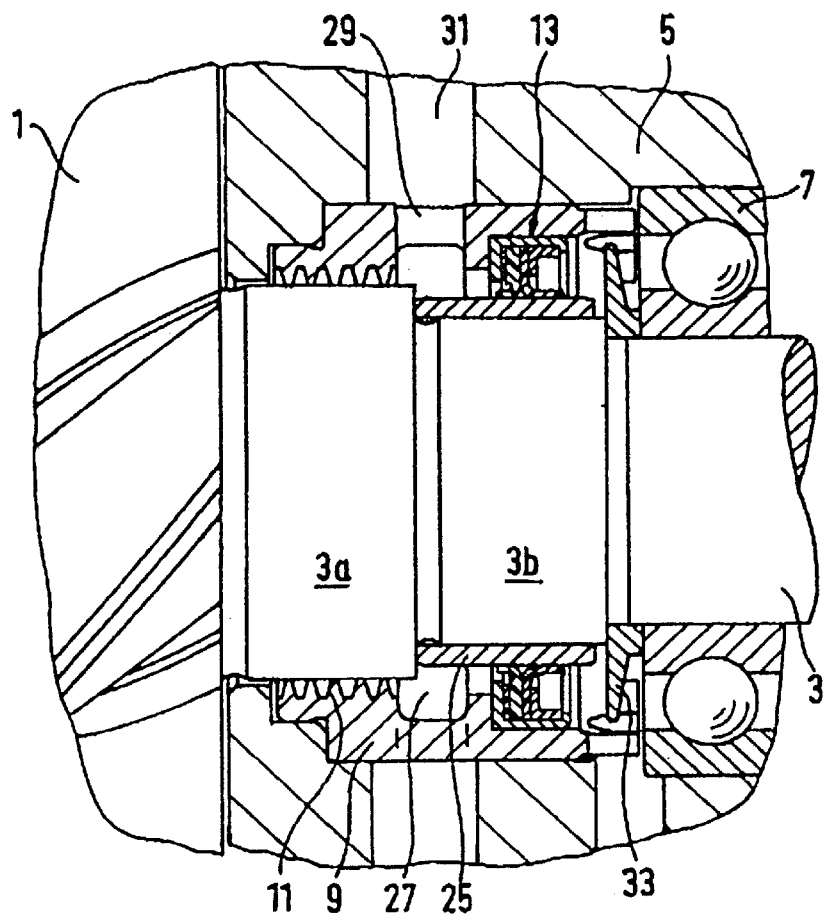
FIG. 1 is an axial section of an embodiment variant of a sealing arrangement according to invention on a shaft peg of the main runner of a screw compressor.

FIG. 1 is a portion of an axial section through a screw compressor, and it shows diagrammatically one of the rotors, for example, the main runner (rib rotor) 1, whose shaft peg 3 is located in a bearing in housing 5, namely the roller bearing 7. The roller bearing 7 is oil lubricated, preferably by means of a lubrication installation (not shown) which produces an oil mist.

A housing ring 9, which is rigidly connected to the housing, is inserted in the housing 5. In the section of the housing ring 1 located closer to the rotor 1, a labyrinth slit seal 11 in the form of several adjacent ring ribs is adapted to its internal circumferential surface. This labyrinth slit seal acts contact-free together with the cylindrical circumferential surface of the section 3a of the shaft peg 3 to achieve the gas seal.

Figure 2:
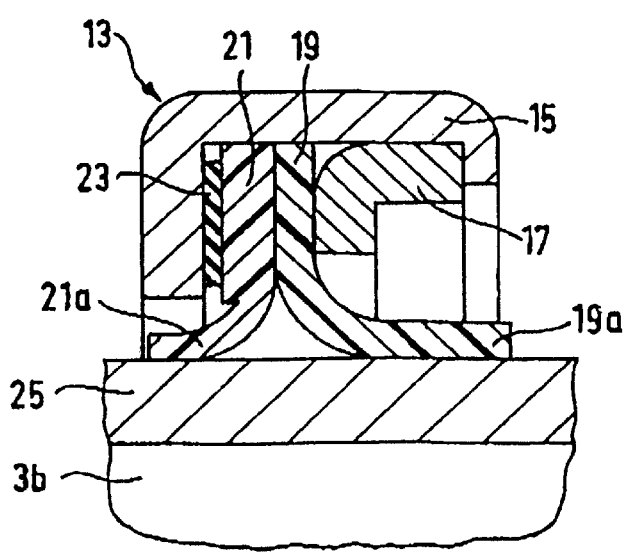
FIG. 2 is a section, at an enlarged scale, through a lip seal ring, as preferably used for the sealing arrangement according to the invention.

A lip seal ring 13 is inserted in the housing ring 9 at the section of the housing ring 9 located closer to the roller bearing 7; it is represented in greater detail in FIG. 2.

The lip seal ring 13 represented in FIG. 2 consists of an external holder ring 15 and an internal holder ring 17, between which two lip rings 19, 21 and a flat seal 23 consisting of flexible elastomer materials are inserted with tension. The sealing lips 19a, 21a of the two lip rings 19, 21 have different lengths. The sealing lip 19a of the lip ring 19, which is bent into the direction of the bearing 7, is longer than the sealing lip 21a of the sealing ring 21, which is bent in the direction towards the rotor.

In the area of the lip seal ring 13, a bearing race 25 is attached on a section 3b of the shaft peg 3; preferably it is attached by shrinkage. The bearing race 25, which can be, for example, a conventional commercial bearing race for a roller bearing, is made of steel with specially hardened circumferential surface, to which the lips 19a and 21a of the lip seal ring 13 are applied. The external diameter of the bearing race 25 is smaller than the external diameter of section 3a of the shaft peg which works in cooperation with the labyrinth slit seal 11.

The hardened and extremely precisely machined, for example, polished, external surface of the bearing race 25 produces a particularly abrasion-reducing application surface for the sealing lips of the lip sealing ring 13. The lip rings 19, 21 are preferably made of an elastomer material based on fluorocarbon polymers.

In the housing ring 9, between the labyrinth slit seal 11 and the lip seal ring 13, a circumferential ring space 27 is formed, which is connected, through an opening 29 of the housing ring 9, with a space 31 of the housing 5, which is open to the atmosphere.

Between the bearing 7 and the lip seal ring 13, on the shaft peg 3 is attached a ring 33 with an external flange, which forms a spray shield, which prevents the direct entry of oil droplets sprayed into the bearing 7 toward the lip seal ring 13.

During the operation of the screw compressor, the labyrinth slit seal 11 works in the conventional manner as a gas seal, whereas the lip seal ring 13 functions as an oil seal with particularly high sealing effect, where leakage from oil from the bearing 7 past the lip seal ring 13 in the direction of the labyrinth slit seal 11 is prevented with high reliability. The step located in the area of the ring space 27 of the housing ring 9 between the external surface of the bearing race 25 and the external surface of the section 3a of the shaft peg prevents the creep of oil along the surface. Any volatile components of the oil, which reach the area of the ring space 27, escape through the ventilation opening 29 into the external air.

Figure 3:
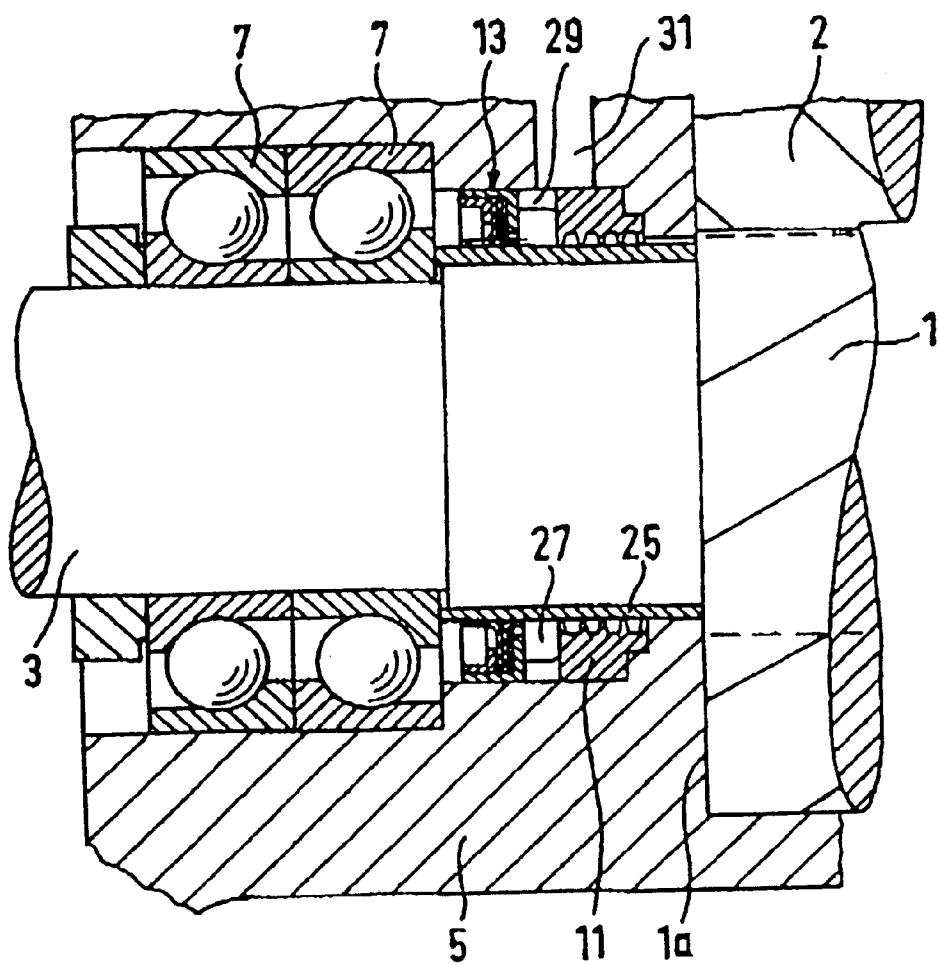
FIG. 3 is a modified embodiment variant of the sealing arrangement.

In the embodiment variant represented in FIG. 3, the shaft peg 3 of the dry-running rotor 1 of a screw compressor is placed in a bearing in the housing 5 by means of oil- or fat-lubricated roller bearings 7 in the housing 5. A second rotor, which engages in a known manner with rotor 1, is indicated by the reference numeral 2.

As in the embodiment variant according to FIG. 1, in the housing 5, a lip seal ring 13 adjacent to the roller bearing 7 and a labyrinth seal ring 11 adjacent to the rotor 1 are inserted. In between, there is a ring space 27, which is in connection, through a ventilation opening 29 with the ventilation duct 31 of the housing, and through it with the external air.

On the shaft peg 3, bearing race 25 is attached, for example, by shrinkage, which has an axial length such that it works in cooperation, not only with the lip seal ring 13, but also extends over the area of the labyrinth seal ring 11. The specially hardened and polished bearing race 25 in the preceding embodiment variant normally does not come in contact with the lip seal ring 11. However, should, a contact nevertheless be established between the lip seal ring 11 and the bearing race 25 as a result of an operational disturbance, then the shaft peg 3 is not damaged as a result, only the bearing race 25 is damaged. Thus, by simply replacing the bearing race 25, the correct sealing state can be reestablished. In addition, the extended bearing race according to FIG. 3 also has the advantage that it can be used as a spacer between the front surface 1a of the rotor 1 and the roller bearings 7. It is only then that it becomes possible, by an exact measurement of the axial length of the bearing race 25, to achieve simultaneously a very precise setting of the front-side slit between the front surface 1a of the rotor 1 and the corresponding front surface of the housing 5.

What is claimed is:

1. A rotary screw compressor having a rotor and at least one rotor shaft peg supported by an oil-lubricated bearing, the compressor further including a sealing arrangement along the rotor shaft peg for establishing a seal between the rotor and the oil-lubricated bearing, the sealing arrangement comprising a housing ring surrounding the shaft peg, in the portion of the housing ring located closer to the rotor, the housing ring including a labyrinth gap seal, which surrounds the shaft peg; in the portion of the housing ring located closer to the oil-lubricated bearing, the housing ring bears a lip seal ring, and in between the lip seal ring and the labyrinth seal, the housing ring defines a ring space with ventilation opening towards the atmosphere, and in that the shaft peg presents a cylindrical circumferential surface, opposite the labyrinth gap seal (11), the sealing arrangement further including a bearing race made of hardened material, which is attached to a shaft peg and works in cooperation with the lip seal ring.

2. The rotary screw compressor as claimed in claim 1 wherein the bearing race has an external diameter that is smaller than the circumferential surface of the shaft peg, opposite the labyrinth gap seal.

3. The rotary screw compressor as claimed in claim 1 wherein the bearing race also forms the circumferential surface of the shaft peg, opposite the labyrinth gap seal.

4. The rotary screw compressor as claimed in claim 1 wherein the lip seal ring of the sealing arrangement includes the bearing race and first and second sealing lips, which are bent in opposite directions, and applied to the bearing race, the first sealing lip being directed towards the oil-lubricated bearing.

5. The rotary screw compressor as claimed in claim 4 wherein a ring-shaped spray shield is located between the oil-lubricated bearing and the lip ring seal.

6. The rotary screw compressor as claimed in claim 4 wherein the bearing race has an external diameter that is smaller than the circumferential surface of the shaft peg, opposite the labyrinth gap seal.

7. The rotary screw compressor as claimed in claim 4 wherein the bearing race also forms the circumferential surface of the shaft peg, opposite the labyrinth gap seal.

8. The rotary screw compressor as claimed in claim 1 wherein a ring-shaped spray shield is located between the oil-lubricated bearing and the lip seal ring.

9. The rotary screw compressor as claimed in claim 8 wherein the bearing race has an external diameter that is smaller than the circumferential surface of the shaft peg, opposite the labyrinth gap seal.

10. The rotary screw compressor as claimed in claim 8 wherein the bearing race also forms the circumferential surface of the shaft peg, opposite the labyrinth gap seal.

* * * * *

UNITED STATES PATENT AND TRADEMARK OFFICE
CERTIFICATE OF CORRECTION

PATENT NO. : 6,287,100 B1
DATED : September 11, 2001
INVENTOR(S) : Carsten Achtelik et al.

It is certified that error appears in the above-identified patent and that said Letters Patent is hereby corrected as shown below:

<u>Title page,</u>
Foreign Application Priority Data, delete "298 97 796 U" and insert -- 298 07 796 U --.

Signed and Sealed this

Twentieth Day of August, 2002

Attest:

Attesting Officer

JAMES E. ROGAN
*Director of the United States Patent and Trademark Office*